2 Sheets—Sheet 1.
G. SIMONSON.
Corn-Planter.
No. 216,113. Patented June 3, 1879.
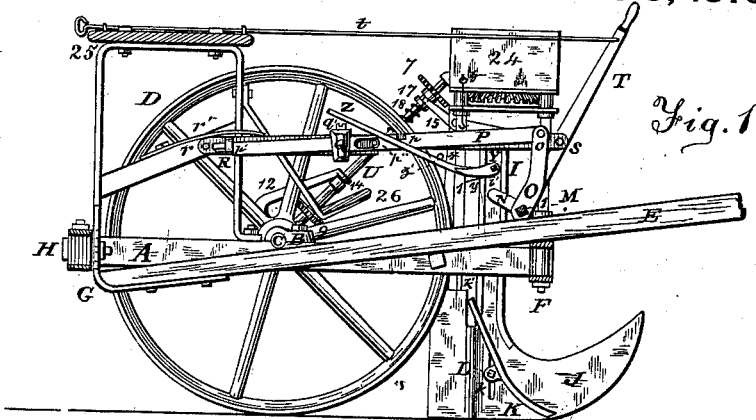
Fig. 1
Fig. 3.
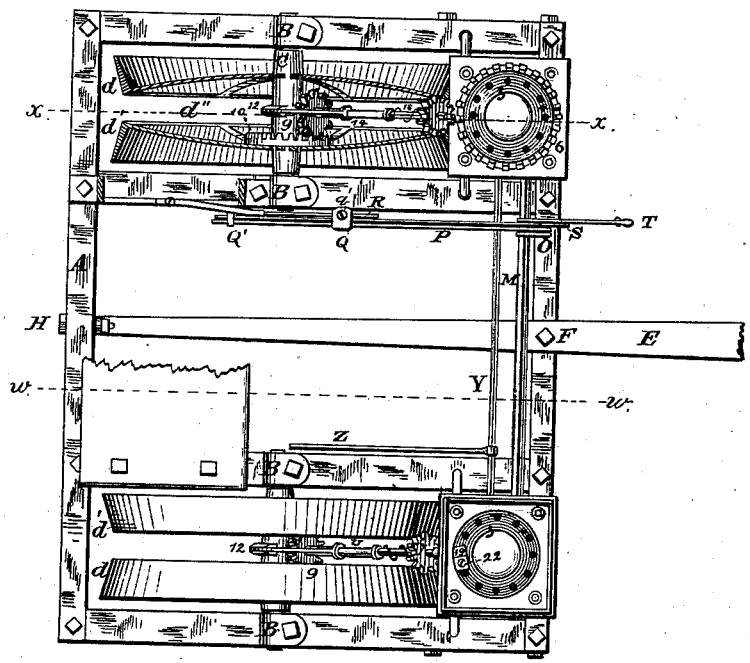
Fig. 9.
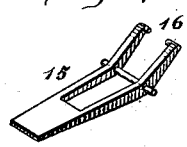
Fig. 8.
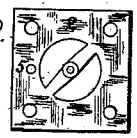
Fig. 10.
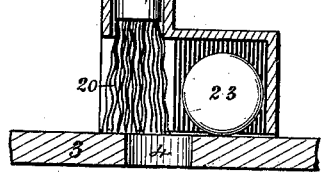
Attest
Walter Knight
L. A. Bond
Inventor:
Gibson Simonson
By. Knight Bros.
Attys.
N. PETERS, PHOTO-LITHOGRAPHER, WASHINGTON, D. C.

2 Sheets—Sheet 2.
G. SIMONSON.
Corn-Planter.
No. 216,113. Patented June 3, 1879.
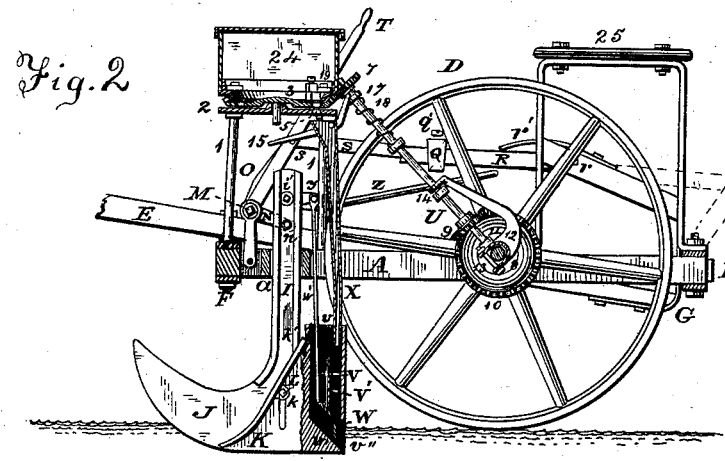
Fig. 2.
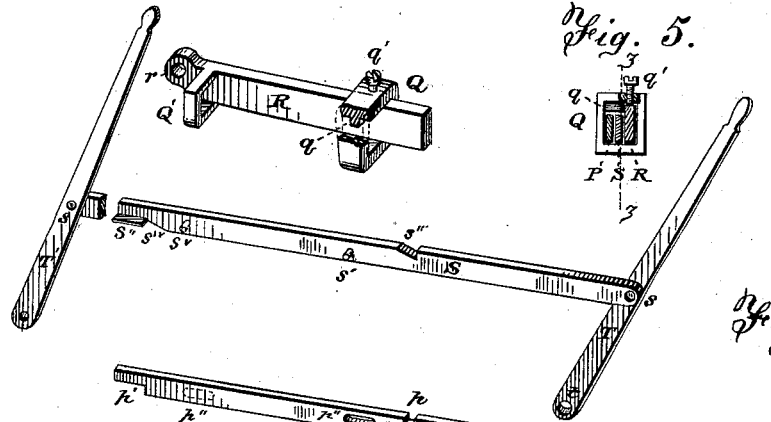
Fig. 4.
Fig. 5.
Fig. 6.
Fig. 7.
Fig. 11.
Attest
Walter Knight
L. A. Bond
Inventor:
Gibson Simonson
By Knight Bros.
Attys.

UNITED STATES PATENT OFFICE.

GIBSON SIMONSON, OF HARRISON, OHIO.

IMPROVEMENT IN CORN-PLANTERS.

Specification forming part of Letters Patent No. 216,113, dated June 3, 1879; application filed March 10, 1879.

*To all whom it may concern:*

Be it known that I, GIBSON SIMONSON, of Harrison, Hamilton county, Ohio, have invented a new and useful Improvement in Corn-Planters, of which the following is a specification.

My invention relates to improvements in machines for planting Indian corn and other grain, and comprises devices for insuring the proper covering of the grain in a ridge of laterally - compressed earth, said ridge being, nevertheless, open and permeable along its crest.

My invention further comprises a novel arrangement of share or furrower, whose elevation or depression is accompanied by the automatic disconnection and reconnection of the seed-distributing mechanism.

My invention further comprises a peculiarly-constructed self-dogging mechanism for elevating and depressing the furrower and securely holding it to either position.

My invention further comprises a new and useful construction of hiller-valve for auxiliary use with the seed-distributing mechanism.

My invention further comprises a novel arrangement of distributer-impelling mechanism, which, occupying the interval between the two members of my duplex ground-wheel, and being geared to it and to the grain-distributer, serves to communicate the motion of the former to the latter.

My invention further comprises a new and useful cut-off brush, in which fine metallic wire takes the place of bristles.

In the accompanying drawings, Figure 1 is a vertical section, on line $w\ w$ of Fig. 3, of a corn-planter embodying my improvements, the form selected for illustration being one adapted for planting two rows simultaneously. In this figure the share or furrower is shown in its elevated position, and the seed-distributer-driving mechanism disconnected. Fig. 2 is a section on the line $x\ x$ of Fig. 3, the share being shown depressed, and the seed-distributer in geared connection with the drive - wheel. Fig. 3 is a partly-sectional top view of the same planter. Fig. 4 represents the members of the self-dogging share-elevator detached. Fig. 5 is a transverse section of the same in their coupled condition, taken at the line $y\ y$ of Fig. 6. Fig. 6 is a longitudinal section of the same at the line $z\ z$ of Fig. 5. Fig. 7 is a perspective view of the share or cutter with one of its wings detached. Fig. 8 is a plan of the seed-distributer floor. Fig. 9 is a detached representation of the lever by which the depression and the elevation of the share are made effective to engage and to disengage the seed-distributer with and from the driving mechanism. Fig. 10 is a vertical section of the cut-off mechanism. Fig. 11 is a perspective view of the hiller-valve.

A represents a stout rectangular frame, having journal-bearings B for shafts C of two peculiarly-formed duplex ground-wheels, D, whose distance apart corresponds with that between two consecutive rows or hills of corn. Each ground-wheel consists of two similar parts, $d$ $d'$, both immovably keyed to their proper wheel-shaft, or to a hub thereupon, and separated from each other by an opening, $d''$, in the plane of rotation of sufficient width to leave, when in operation, an uncompressed ridge of ground in the immediate wake of the seed-dropper. This equatorial opening in the ground-wheel is, in the preferred form of my planter, also utilized as a space for the geared shafting U, by which the motion of the ground-wheel is transmitted to the seed-distributer.

In order that the said ground-wheel may be available for pressing the earth in the form of a ridge around the deposited grain, and yet leave the crown of the ridge uncompressed and permeable, the periphery of each member $d\ d'$ has the form of a conic frustum, whose flare is outward from their common interval of separation, $d''$.

A suitable tongue or pole, E, being bolted at F to the front sill, extends rearward, where it terminates in a flange, G, having either a slot or a series of perforations for a bolt, H, which, being inserted in one or other perforation, secures the pole at the special pitch or angle which will maintain the frame at its proper level after engagement of the horses or other draft-animals employed.

That part of the frame immediately in front of the central interval, $d''$, of each duplex wheel is formed into a guide and socket, $a$, for the shank or stem I of a share or furrower, which consists of an upcurved prow or cutter, J, to which are attached wings K. These wings may have perforated or slotted flanges $k$ to receive bolts L, and shoulders $k'$ to engage behind the share-stem, to enable the wings to be secured at any desired height upon the cutter.

The depression of the share below the level of the wheel-tread, and the consequent depth of furrow, is controlled by a peculiarly-constructed self-dogging mechanism, which I now proceed to describe.

M is a shaft, which, extending athwart the front of the frame and being properly journaled therein, has two arms, N, of which each has a wrist, $n$, that occupies an orifice, $i$, in either share-stem. Another arm, O, from said shaft is pivoted at $o$ to a dogging-bar, P, that extends rearward through yokes or guide-eyes Q Q' upon an oscillating bar, R, pivoted at $r$ to the frame, and pressed downward by a spring, $r'$. The attachment of the yoke Q to the bar R is effected by means of a set-screw, $q'$, which, being momentarily slackened, enables the said yoke to be so located upon the said bar as to secure the desired greater or less depression of the furrower. Another bar, S, called by me the "undogging" or "releasing" bar, is located between the bars P and R, and occupies the same guides Q Q', and is pivoted at $s$ to a lever, T, whose circular eye $t$ enables it to vibrate freely upon the shaft M.

The dogging-bar P has a notch, $p$, which, in the backward position of the lever T, corresponding to the depressed condition of the furrower, (see Fig. 2,) engages a pin or projection, $q$, from the guide Q, and thereby prevents any accidental dislodgment of the dogging-bar. This locking of said bars holds the furrower to its depressed position.

The rear end of the dogging-bar has a jog or shoulder, $p'$, which, when the bar is drawn forward, corresponding to the elevated position of the furrower, (see Fig. 1,) drops down in front of the yoke Q, and retains the bar P and the share or furrower to said positions.

Although thus securely dogged against accidental displacement, the bar P may be instantly released from either position by the operator by a simple movement of the lever T—that is to say, by a forward movement for release of the furrower from its depressed position, and by a rearward movement for its release from the elevated position.

To secure an always simultaneous elevation and depression of the bars P and S, and a simultaneous longitudinal movement after a short preliminary stroke of the bar S, a projection, $s'$, from bar S occupies a slot, $p''$, in bar P, and a lip, $s''$, on bar S engages under rear end of bar P.

A sloping shoulder, $s'''$, and another sloping shoulder, $s^{iv}$, are formed on the lower edge of bar S. These shoulders operate alternatively, in conjunction with the respective yokes, to undog the bar P, and, in so doing, to permit a reversal of the entire share-shifting apparatus. This is effected in the following manner: Suppose the share to be depressed and the lever T at the rearward extremity of its stroke, as in Fig. 2, and the pin $s'$ to be consequently at the rear end of the slot $p''$, and the projection $q$ to be at the bottoms of the indentations $p$ and $s'''$, and suppose it be desired to reverse the shifter, and thus to elevate the share, the lever T and its attached bar S are moved forward. In the early part of this movement the pin $s'$ simply travels the length of the slot $p''$ without producing any effect upon the bar P; but during this initiatory movement the sloping shoulder $s'''$, pressing upward against the projection $q$, lifts also the yoke Q and bar R and undogs the bar P, so that by the time the bar S has traversed the length of the slot $p''$ and its pin $s'$ commences to press against the forward end of said slot both bars are for the moment at liberty to travel in company, and the continued advance of the lever T and its attachments operates to elevate the share to the position shown in Fig. 1, when, the jog $p'$ dropping in front of the yoke Q', the parts are again automatically locked in position. From such position the parts can be dislodged only by a reversal of the lever T, when the pin $s'$, moving backward in slot $p''$ without at first affecting the bar P, gives the shoulder $s^{iv}$ time to ride up on the yoke Q', and, by lifting the rear end of the bar P, to elevate the jog $p'$ clear of said yoke, and thus again liberate all the parts for a completion of their stroke; which having been effected, the projection $q$ again enters the notches $p$ and $s'''$ and automatically locks the shifter. The spring $r'$, having a constant downward stress upon the bar R, prevents any accidental disengagement of the dogging mechanism.

The above-described device, while securing the share against any accidental dislodgment from the position, whether of elevation or depression, at which it may be set by the person in charge, enables him to control it by simple forward and backward vibrations of the lever T, and dispenses with the spring-catch, requiring a distinct manipulation, and with its accessories of arched rack, &c., usually employed in shifting mechanism of this kind.

The depression of the share or furrower to a less or greater depth is provided for by simply securing the yoke Q to a position nearer to or more distant from the lever T. Serrations $r''$ on the lower edge of bar R, occupying corresponding serrations in yoke Q, coact with screw $q'$ to secure the yoke to whatever position it is adjusted.

Formed in or attached to the back edge of the cutter J are two ducts, V V', one immediately in rear of the other, and separated from it by a partition, $v$, that extends downward to near a sloping bottom, $v'$, common to both. Of these ducts, the foremost one, V, receives and guides the rod $w''$ of a drop or hiller valve, W, of the peculiar form represented. The backward slope of the duct-floor $v'$ compels said valve W, as it is depressed by rod $w''$, to move rearward until it becomes flush with and closes an aperture, $v''$, at the foot of the rear wall of the duct V', the corresponding obliquity of the upper member of said valve operating to draw it back into the duct V in obedience to a lifting motion of the said valve-rod. For this purpose the hiller-valve W consists of two flat rectangular members, of which one member, w, to which the rod w'' is attached, has the same inclination as the duct-floor v', and of which the other member projects obtusely from the first, so as to be vertical in position. Of these members, the member w is so dimensioned as to just close one or other duct, according to whether it is in the retracted or protracted position, and the member w' is so dimensioned as to accurately close the opening under partition v in its retracted and the outlet or ventage v'' in its protruded position. The rearmost duct, V', receives at its upper end a tube, X, whose office it is to conduct grain from the distributer.

The rod or stem w'' of valve W is pivoted to an arm, y, upon a shaft, Y, that, being journaled at i' in the cutter-stem I, extends entirely across the machine, in order that it may simultaneously operate the valves in both groups of seeding apparatus.

Projecting from shaft Y is a lever, Z, which, when the machine is to be used for planting in hills, is allowed to occupy, by its own gravity, the depressed position shown in Fig. 1, and which, when the implement is to be employed for drill-planting, is secured to its uppermost position by the engagement of a hook, z, in an eye or staple, z', upon the lever, or by other suitable means.

The lever Z, with its described accessories, constitutes a distinct apparatus from the seed-dropping mechanism proper, and, when used at all, is always in conjunction with the latter, and is only used when it is desired to plant in hills.

The seed-dropping mechanism proper is always active when the machine is at work, whether as a hiller or as a drill. This mechanism is constructed as follows: Posts 1, which rise from that part of the frame A immediately in front of each ground-wheel, support the bed 2, which bed supports and centers a seed-distributing disk or plate, 3, having the customary series of orifices 4, which, by turn, convey each a grain of corn to a similar orifice, 5, in the bed located immediately over the tube X, that leads into the duct V', which conveys grain to the furrow. The disk 3 is armed at its periphery with cogs 6, that intermesh with those of a pinion, 7, located at the upper extremity of the shaft U, which, extending obliquely downward and rearward, has at its lower extremity a pinion, 9, which meshes in a cog-wheel, 10, attached either to the ground-wheel or to its shaft. Of these pinions, the lower one, 9, is fast upon the shaft U, while the upper one, 7, is made capable of being slid upward or downward upon the shaft, while compelled to share its rotation by any suitable or customary means, such as a tongue or feather upon the shaft occupying a groove in the pinion, or by giving the pinion-eye and that part of the shaft along which it slides a square or other non-circular form.

The lower extremity of the shaft U occupies a socket, 11, in a hanger, 12, of the form represented in Fig. 2, the lower end, 8, of said hanger being for this purpose forked, and grasping the ground-wheel shaft at that portion of it which intervenes between the two members d d' of the said wheel. Said forked end is held in place by a bolt, 13. Said hanger terminates above in a ring, 14, which encircles the shaft U.

The shaft U, together with its embracing hanger 12, are maintained at their proper upward and forward sloping position, parallel with and midway between the two members d d', by the joint agency of said forked lower extremity, 8, and the wheel-shaft below, and that of a bent lever, 15 16, above. This lever is pivoted underneath the bed 2. One part, 15, of said lever is horizontal, and extends over the head of the share-stem I. The other part, 16, is directed obliquely upward and rearward, so as to be approximately perpendicular to the shaft U, and has a forked extremity, which embraces the grooved hub 17 of the upper pinion, 7.

A spring, 18, maintains said pinion at its uppermost position and in gear with the seed-distributing disk, as seen in Fig. 2, save when forcibly depressed and compelled to take a lower position upon the shaft U by the elevation of the remote end of lever 15 16. This elevation is effected automatically by the impact of the head of the cutter-shank I in being brought to its unearthed position, as in Fig. 1.

The above-described apparatus thus enables the furrowing and the seed-dropping devices to be simultaneously changed from their operative to their inoperative conditions, and vice versa, by the single act of shifting the lever T to its forward and backward dogging positions, respectively.

The lever T, with the described notched and shouldered slide-bars, dog-yokes, and their accessory features, although by me specially devised for the elevation and depression of a furrowing-share, and the simultaneous disconnection and connection of the seeding apparatus of a corn-planter, are obviously applicable to a great variety of uses where shifting-levers, with their customary indispensable accessories, such as spring-catches and arched racks, are now employed, such as the clutch-operating levers of harvesters, of thrashing-machines, and of many other agricultural implements.

19 represents the case or housing of the cut-off brush. In the cut-off brush, which I have devised for this purpose, the customary bristles are replaced by fine wires of any strong and sufficiently elastic metal, such as steel or brass, so bound and soldered, or otherwise permanently united, at their upper extremities as to constitute a cylindrical bundle, 20, having a solid head, 21. These wires are preferably waved or kinked in the manner shown, so as to slightly intermesh with and support one another, and, if of steel or other corrodible metal, are plated with tin, nickel, or copper, or otherwise protected against rust.

The component wires of the cut-off should be of such gage as to yield sufficiently, and yet oppose the necessary resistance for efficient action as a cut-off. For brass wire, No. 30 gage serves a good purpose. The wire, if of steel, may be of finer gage.

A screw, 22, tapped through the case-roof, enables the brush to be set down so as to bear with proper stress upon the distributing-plate. The case 19 is enlarged on the delivery side of the cut-off brush to hold a heavy ball, 23, which, by dropping partially into each orifice as it passes behind the brush, operates to push down and insure the exit of lodging kernels.

A cut off brush composed of metal wires instead of bristles is more durable and efficient than the latter, and, so far as known to me, has never before been employed in such use or connection. The bed 2 is surmounted by a suitable grain-box or hopper, 24.

25 and 26 represent a seat and foot-rest for the driver. The foot-rest may be secured at any height upon the seat-stand or upon the pole to suit the convenience of the driver.

The drop-valve W, in addition to its proper functions as a hilling-valve, may be used as a piston or a stopper to expel and keep out dirt or extraneous matters from the ventage $v''$.

The above-described illustration of my invention may be modified or elaborated to suit any special requirements. For example, to enable the share-shifter to be operated by a person following the machine on foot, the bar S may extend rearward to a supplementary lever, T′, as in Figs. 2 and 4; or a rod, $t$, may extend from the lever T to a convenient point at the rear of the machine, as in Fig 1.

Instead of the projection $s''$ on the bar S engaging under the bar P, a pin, $s^v$, on the bar S, near its rear end, may occupy a slot, $p''$, in the bar P, as in Fig. 4.

One or both bars P S may have a spur, $s^{vi}$, as in Fig. 6, to prevent these members being inadvertently drawn entirely out of the rear yoke, Q′.

The lever T may terminate at the joint $s$, and a lever, T″, be pivoted to the frame, as at $t''$, Fig. 6, in the position deemed most convenient for the driver, and be coupled to the bar S by means of a link, $t'''$.

My metallic cut-off brush, while usually and preferably of the represented cylindrical form, may, if desired, have a square or other transverse section.

I claim as new and of my invention—

1. In a seeding-machine or corn-planter, the duplex ground-wheel D, consisting of the pair of coaxial frustra $d\ d'$, fastened on the same shaft C, with an interval of separation, $d''$, open from the ground to the wheel-hub in the immediate wake of the grain-dropper, substantially as and for the purpose set forth.

2. In combination with the duplex ground-wheel D, the geared shaft U or its equivalent, which extends upward and forward in the interval $d''$ from the gear of said ground-wheel to that of the seed-distributer, substantially as set forth.

3. In combination with the duplex supporting and covering wheel C D and the geared shafting U 7 9 10, the hanger 12, whose forked lower end, 8, grasps and rests upon that portion of the shaft C in the interval $d''$ between the two members $d\ d'$ of said wheel, said fork being secured to said shaft by bolt 13, and being socketed to the toe of shaft U, said hanger being surmounted by a ring, 14, that encircles said shaft, substantially as set forth.

4. The described combination of shiftable furrower and grain-duct I J V V′, bent lever 15 16, with the shiftable pinion 7 17, and the spring 18 upon the seed-distributer shaft U, substantially as set forth.

5. The ducts V V′, one in rear of the other and both at the rear edge of the furrower, for the valve-stem and grain-delivery, respectively, in the described combination with the hiller-valve W and the grain-spout X, substantially as set forth.

6. In combination with the two parallel ducts V V′, one in rear of the other, having the partition $v$, the rearwardly-sloping bottom $v'$, and the rear ventage, $v''$, the hiller-valve W, formed and operated substantially as set forth.

7. In combination with a seed-distributer, a grain-duct, and an adjustable furrower, substantially as described, the described hiller-valve mechanism, consisting of shaft Y, journaled in the furrower-stem, and having the lever Z and the arm Y, pivoted to the stem $w'$ of the hiller-valve W, in the manner set forth.

8. The automatically-dogged share-elevating mechanism, consisting of arms N O R, spring $r$, lever T, notched and slotted bar P $p\ p'\ p''$, shouldered bar S $s'''\ s^{iv}$, having projections $s'\ s''$, in combination with the yokes Q Q′, and their described accessories or their substantial equivalents, the whole being combined and operating substantially as and for the purpose set forth.

9. In combination with the arms N O R, the lever T, or its equivalent, and the bars P and S, the yokes Q Q′ and adjustable devices $q'$ $r''$, substantially as and for the purpose set forth.

10. As a new and useful article of manufacture, the cut-off brush for a seeding-machine, provided with elastic metal wires of kinked or waving form, said wires being secured at their upper ends into a cylindrical or other convenient bundle, substantially as set forth.

In testimony of which invention I hereunto set my hand.

GIBSON SIMONSON.

Attest:
  GEO. H. KNIGHT,
  L. H. BOND.